United States Patent
Zeygerman et al.

(10) Patent No.: US 7,141,758 B2
(45) Date of Patent: Nov. 28, 2006

(54) LASER PROCESSING INSTALLATION WITH READILY ACCESSIBLE CUTTING UNIT

(75) Inventors: Leonid Zeygerman, West Hartford, CT (US); Walter Kampitsch, New Britain, CT (US); Jorge Medeiros, Waterbury, CT (US)

(73) Assignee: Trumpf, Inc., Farmington, CT (US)

( * ) Notice: Subject to any disclaimer, the term of this patent is extended or adjusted under 35 U.S.C. 154(b) by 450 days.

(21) Appl. No.: 10/676,553

(22) Filed: Oct. 1, 2003

(65) Prior Publication Data

US 2005/0072768 A1    Apr. 7, 2005

(51) Int. Cl.
*B23K 26/14*    (2006.01)
*B23K 26/16*    (2006.01)

(52) U.S. Cl. .......................... 219/121.67; 219/121.76; 219/121.82

(58) Field of Classification Search ........... 219/121.67, 219/121.78, 121.82, 121.66, 121.85
See application file for complete search history.

(56) References Cited

U.S. PATENT DOCUMENTS

| | | | |
|---|---|---|---|
| 3,226,527 A | 12/1965 | Harding | |
| 3,855,445 A | 12/1974 | Jungle | |
| 4,316,073 A | 2/1982 | Lemelson | |
| 4,656,713 A | 4/1987 | Rosa et al. | |
| 4,659,902 A | 4/1987 | Swensrud et al. | |
| 4,677,734 A | 7/1987 | Bloch et al. | |
| 4,698,480 A | 10/1987 | Klingel | |
| 4,851,637 A * | 7/1989 | Puozzo et al. | 219/121.78 |
| 4,931,615 A | 6/1990 | Muncy et al. | |
| 4,940,880 A | 7/1990 | Klingel et al. | |
| 5,101,089 A | 3/1992 | Bortolotto et al. | |
| 5,109,148 A * | 4/1992 | Fujita et al. | 219/121.82 |
| 5,132,510 A * | 7/1992 | Klingel et al. | 219/121.82 |
| 5,192,848 A | 3/1993 | Miyakawa et al. | |
| 5,304,773 A * | 4/1994 | Kilian et al. | 219/121.78 |
| 5,310,991 A | 5/1994 | Franco | |
| 5,359,175 A | 10/1994 | Miyagawa et al. | |
| 5,373,136 A | 12/1994 | Ernst et al. | |
| 5,439,431 A | 8/1995 | Hessbrüggen et al. | |
| 5,481,083 A | 1/1996 | Smyth, Jr. | |
| 5,637,243 A * | 6/1997 | Sato et al. | 219/121.67 |
| 5,744,778 A | 4/1998 | Kash et al. | |
| 5,854,460 A * | 12/1998 | Graf et al. | 219/121.67 |
| 5,885,199 A | 3/1999 | Shao | |
| 5,901,938 A | 5/1999 | Mosca et al. | |
| 5,989,374 A | 11/1999 | Bull et al. | |
| 6,013,895 A | 1/2000 | Steadman | |
| 6,046,428 A | 4/2000 | Serruys | |
| 6,163,010 A | 12/2000 | Kobsa | |

(Continued)

FOREIGN PATENT DOCUMENTS

JP    08309569    11/1996

(Continued)

*Primary Examiner*—M. Alexandra Elve

(57) ABSTRACT

A machine tool installation for laser cutting of sheet workpieces has a workpiece support, an elongated machine frame of generally C-shaped configuration providing an arm extending over the workpiece support, a pair of tracks on the arm and extending longitudinally of the frame. A motion unit is suspended from the tracks and mounted for movement therealong with one end located adjacent the outer side of the workpiece support. The motion unit is movable bidirectionally along the track, and a laser cutting unit is mounted on the motion unit and includes a laser cutting head movable thereon in an axis perpendicular to the arm. The laser cutting unit is moved along the motion unit and is movable to the one end of the motion unit on the outer side of the workpiece support for facile servicing thereof by an operator.

8 Claims, 16 Drawing Sheets

U.S. PATENT DOCUMENTS

| | | |
|---|---|---|
| 6,213,704 B1 | 4/2001 | White et al. |
| 6,233,538 B1 | 5/2001 | Gupta et al. |
| 6,243,611 B1 | 6/2001 | Hazama et al. |
| 6,277,319 B1 | 8/2001 | Hardgrove et al. |
| 6,433,342 B1 | 8/2002 | Cordts, III et al. |
| 6,445,971 B1 | 9/2002 | Gottschalk et al. |
| 6,452,195 B1 | 9/2002 | Smick et al. |
| 6,472,253 B1 | 10/2002 | Bothra |
| 6,606,531 B1 * | 8/2003 | Leibinger et al. ........... 700/114 |

FOREIGN PATENT DOCUMENTS

| | | |
|---|---|---|
| JP | 2000024795 | 1/2000 |

* cited by examiner

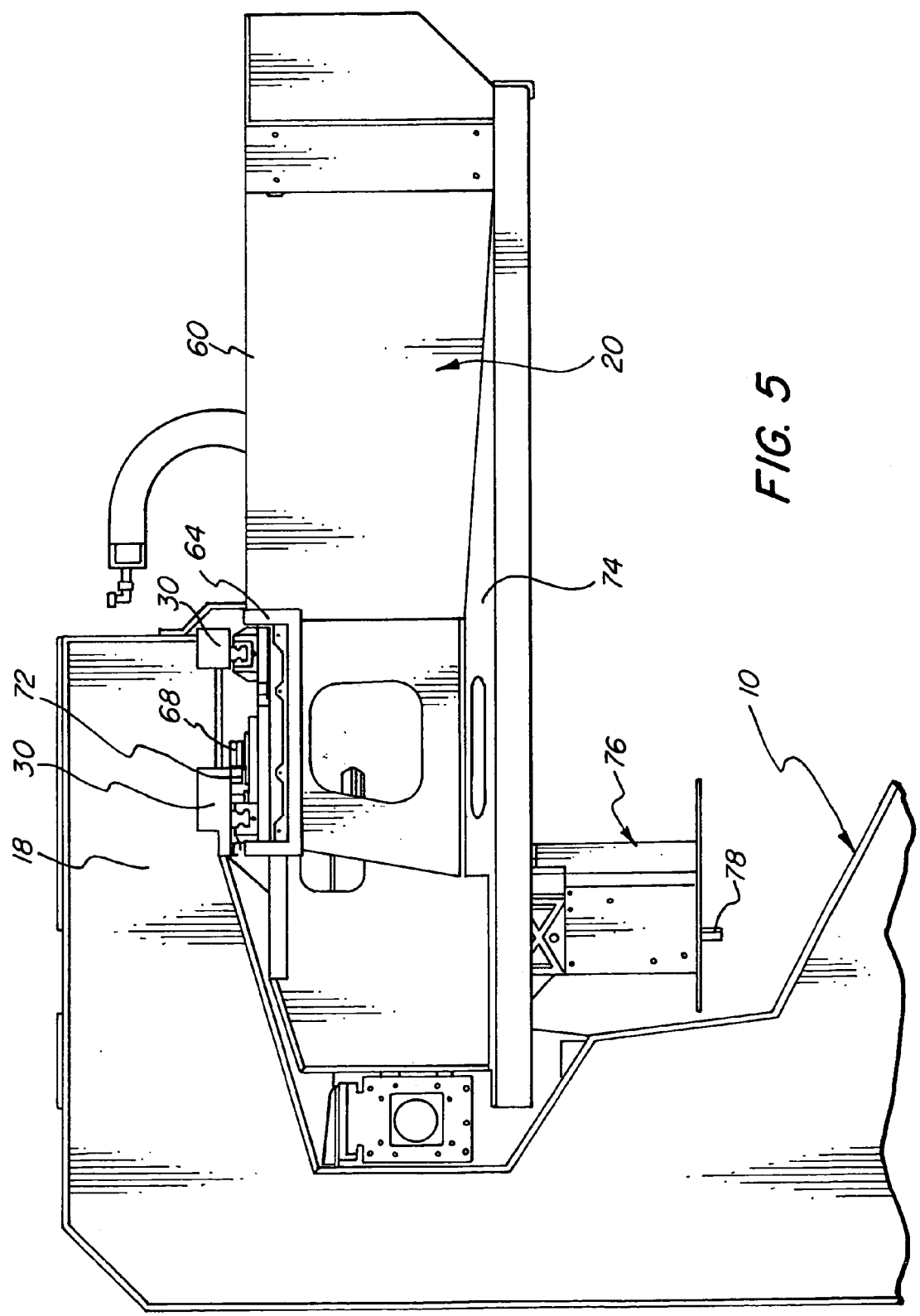

LASER PROCESSING INSTALLATION WITH READILY ACCESSIBLE CUTTING UNIT

BACKGROUND OF THE INVENTION

The present invention relates to laser cutting installations in which the sheet metal is disposed on a workpiece support below a movable cutting head.

Laser cutting machines are now widely employed for processing of sheet metal workpieces since the laser will cut the sheet metal rapidly and the laser beam and/or the workpiece can be moved by a guidance system to enable precise cutting of parts. One type of common laser cutting machine for processing large sheet metal workpieces has a work support over which there is a movable bridge, and the laser cutting head is supported on the bridge. The bridge can be moved along the workpiece support to effect cutting of the workpiece in the longitudinal direction, and the laser cutting head can be moved along the bridge to effect cutting in the transverse direction. Illustrative of such machines is Erlenmaier U.S. Pat. No. 6,586,706 and Kilian U.S. Pat. No. 5,304,773.

Loading units for the sheet metal workpieces have been widely employed for punch presses and laser cutting machines and generally involve suction devices which are arranged in a grid that can be adapted to the size of the sheet metal workpiece to be picked up and carried by the loading unit. Generally, such loading units will pick up the sheet metal and then rotate or otherwise move to deposit the sheet on the workpiece support in the desired position. Exemplary of such loading units is that illustrated and described in Leibinger et al U.S. Pat. No. 6,066,531.

The cutting operation will frequently produce numerous small parts and a skeleton which must be removed from the workpiece support. Although the operator may remove and sort them manually, this extends the processing time and reduces the productivity of the laser cutting machine. Accordingly, various types of units have also been provided for removing from the workpiece support the cut parts and skeleton. It has also been proposed to leave small webs of material retaining the cut parts in the skeleton so that the cut workpiece can be lifted as a unit by a suction arrangement; the remaining webs are then broken to release the parts from the skeleton after it has been transported to a separation station.

As is well known, the cutting heads require servicing and replacement of optics. Unfortunately, the prevalent bridge mounted laser cutting units enclosing the laser cutting head are difficult to access and frequently require the operator to climb onto the workpiece support to be able to service the unit.

It will be appreciated that these types of installations involve separate units with their own drive mechanisms. A numeric control system must not only control the cutting motion but also the motion of the loading unit and the unloading unit as the case may be. At times this presents problems from the standpoint of effecting the desired alignment of the workpiece in the workstation or rapid changes between different cutting programs.

It is an object of the present invention to provide a novel laser cutting installation in which the cutting head is readily accessible to the operator for servicing and change of optics.

It is also an object to provide such a laser cutting installation which can be fabricated relatively readily and which is simple to operate and maintain.

SUMMARY OF THE INVENTION

It has now been found that die foregoing and related objects may be readily attained in a machine tool installation for laser cutting of sheet workpieces comprising a workpiece support, an elongated machine frame of generally C-shaped configuration providing an arm extending over the workpiece support, and a track on the arm and extending longitudinally of die frame. A motion unit is suspended from the track and mounted for movement therealong with one end located adjacent the outer side of the workpiece support. Drive means is provided for moving the motion unit bidirectionally along the track, and a laser cutting unit is mounted on the motion unit and includes a laser cutting head movable thereon in an axis perpendicular to the aim. Drive means for moving the laser cutting unit along the motion unit, the laser cutting unit being movable to the one end of the motion unit on the outer side of the workpiece support for facile servicing thereof by an operator. A controller is operable to control movement of the motion unit along the track to effect motion of the motion unit and of the laser cutting head relative to a workpiece on the workpiece support to produce cut parts, and to position the laser cutting unit at the one end of the motion unit adjacent the outer side of the workpiece support for servicing of the laser cutting head.

Preferably, a pair of parallel tracks is provided on the arm of the machine frame and the motion unit is movable thereon. The motion unit drive means comprises a rack on the arm of the machine frame, a pinion on the motion unit engaged with the rack, and a bidirectional motor for driving the pinion. The motion unit has guides on its lower surface extending perpendicularly to the machine frame arm, and wherein the laser cutting unit is movably mounted on the motion unit guides. The laser cutting unit is movable by a rack and pinion drive assembly and a reversible drive motor.

Laser cutting of the workpiece in the longitudinal direction of the frame (X-axis) is effected by movement of the motion unit on the tracks and cutting in the direction perpendicular thereto (Y-axis) is effected by movement of the laser cutting unit along the guides on the motion unit. The laser cutting unit also includes a drive for moving the laser cutting head in the vertical direction, and the motion unit is supported on the tracks adjacent its center to increase its stiffness.

BRIEF DESCRIPTION OF THE ATTACHED DRAWINGS

FIG. 5 is a side elevational view drawn to an enlarged scale of the motion unit in FIG. 1;

Figure 8A:
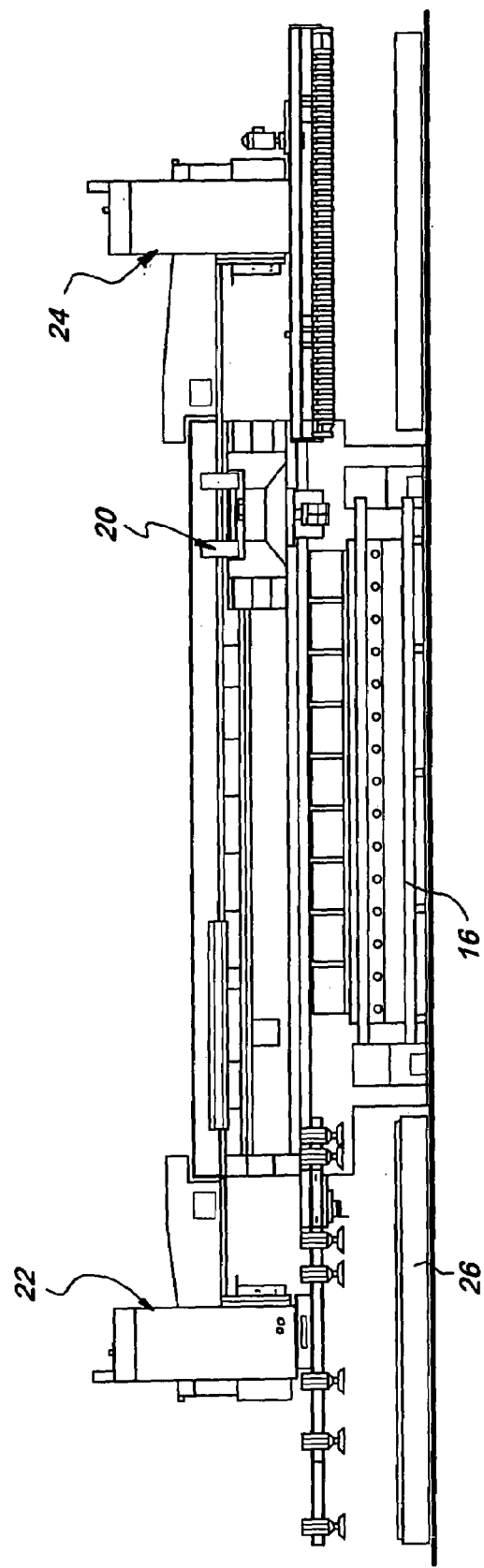
FIG. 8a is a view of the principal operating components of the laser cutting machine in the position for coupling the unloading unit to the motion unit and with the loading unit uncoupled.
Figure 8B:
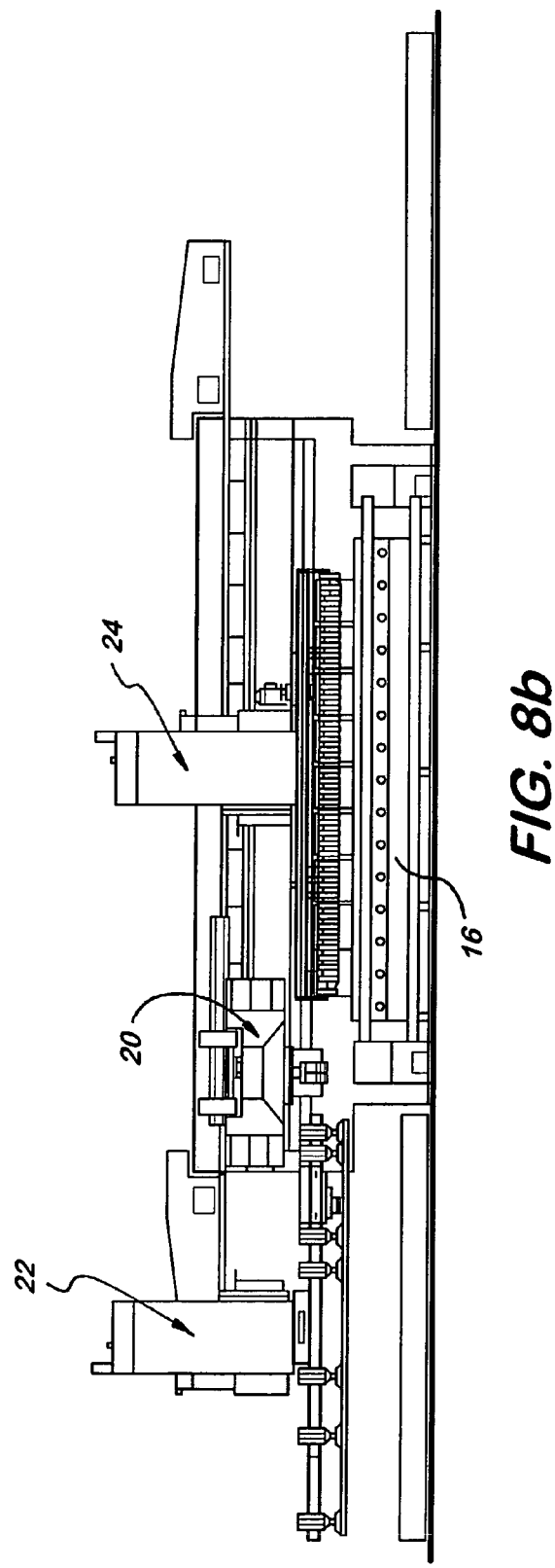
FIG. 8b is a similar view with the units shown in the position for unloading of the skeleton and cut parts from the workpiece support table and for coupling the loading unit to the motion unit.
Figure 8C:
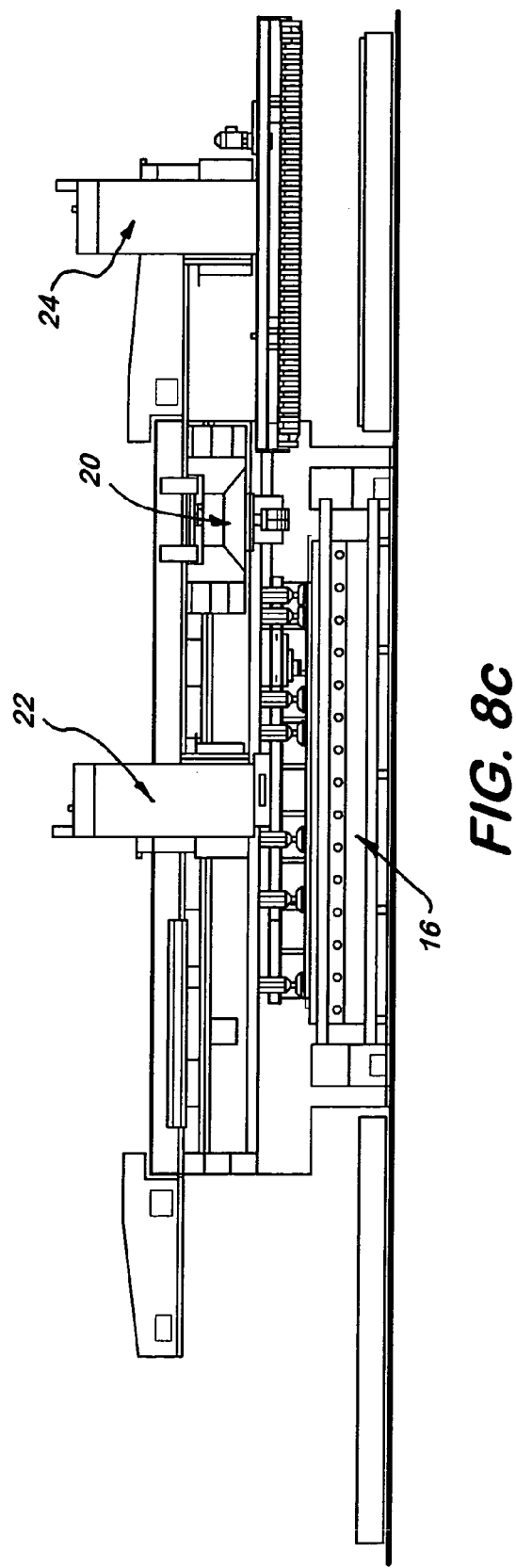
FIG. 8c is a similar view showing the loading unit after it has placed a fresh workpiece on the surface of the workpiece support table and the unloading unit has discharged the parts and skeleton.
Figure 8D:
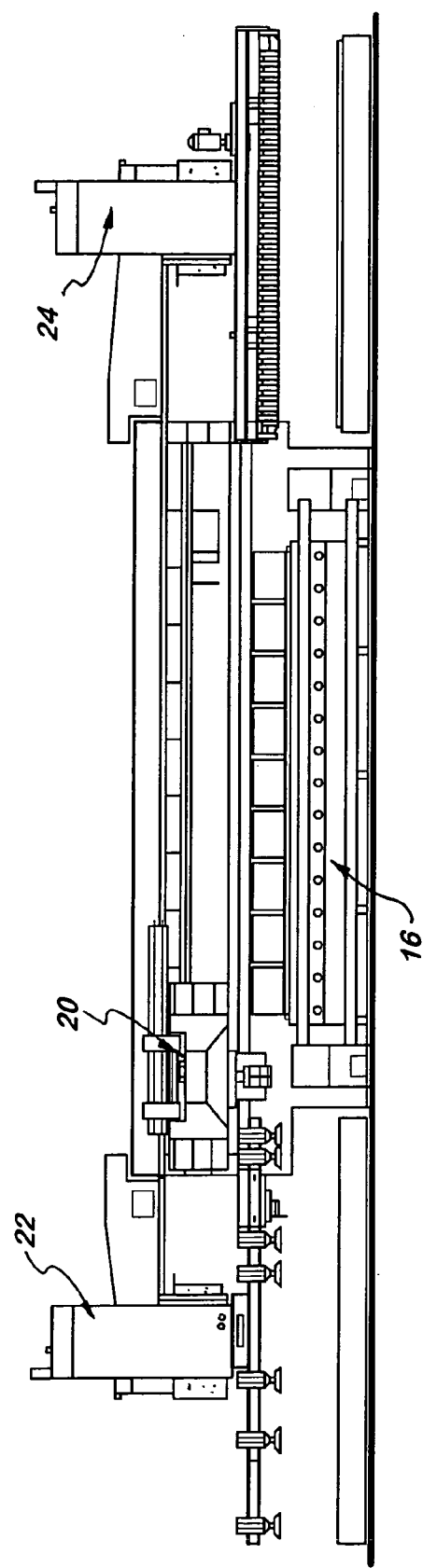
FIG. 8d is a similar view showing the components after the loading unit has been returned to its home position.
Figure 8E:
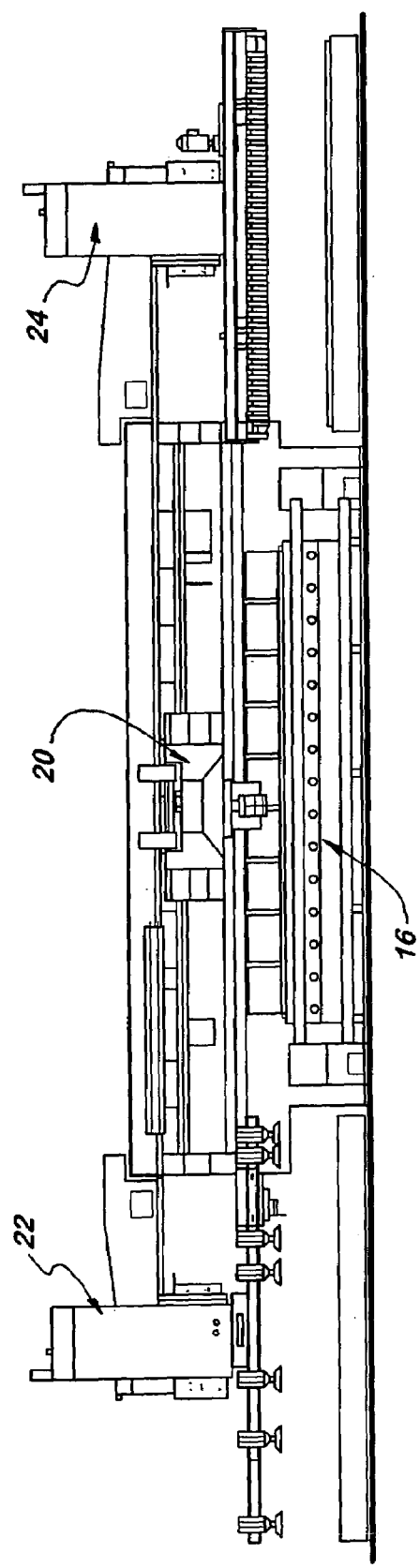
Figure 9A:
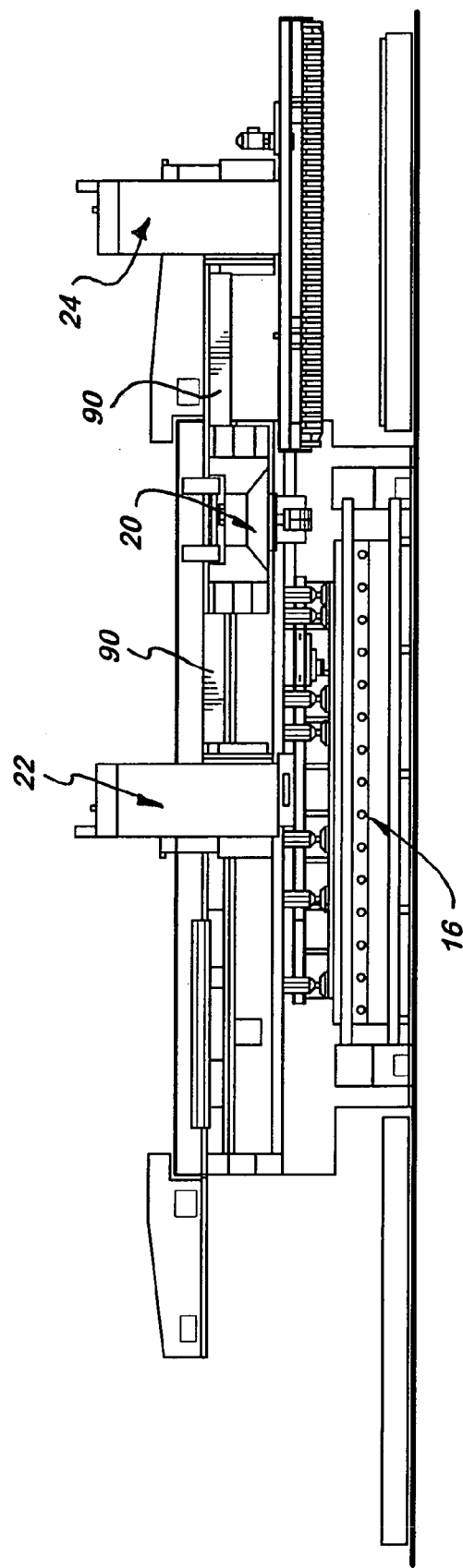
Figure 9B:
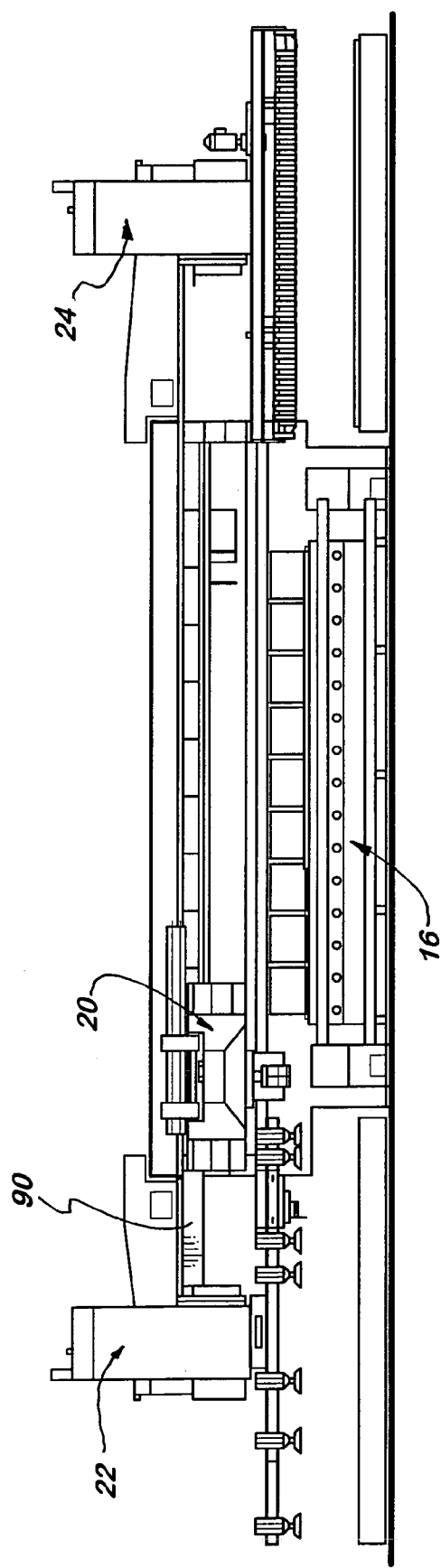

FIG. 8e is a similar view of the motion unit in position for laser cutting and with the loading and unloading units latched in their home positions; and FIG. 9a is a front elevational view of the laser cutting machine diagrammatically showing the coupling devices on both the loading and unloading units coupled to the motion unit; and FIG. 9b shows only the loading unit coupling device coupled to the motion unit.

BRIEF DESCRIPTION OF THE ILLUSTRATED EMBODIMENTS

Figure 1:
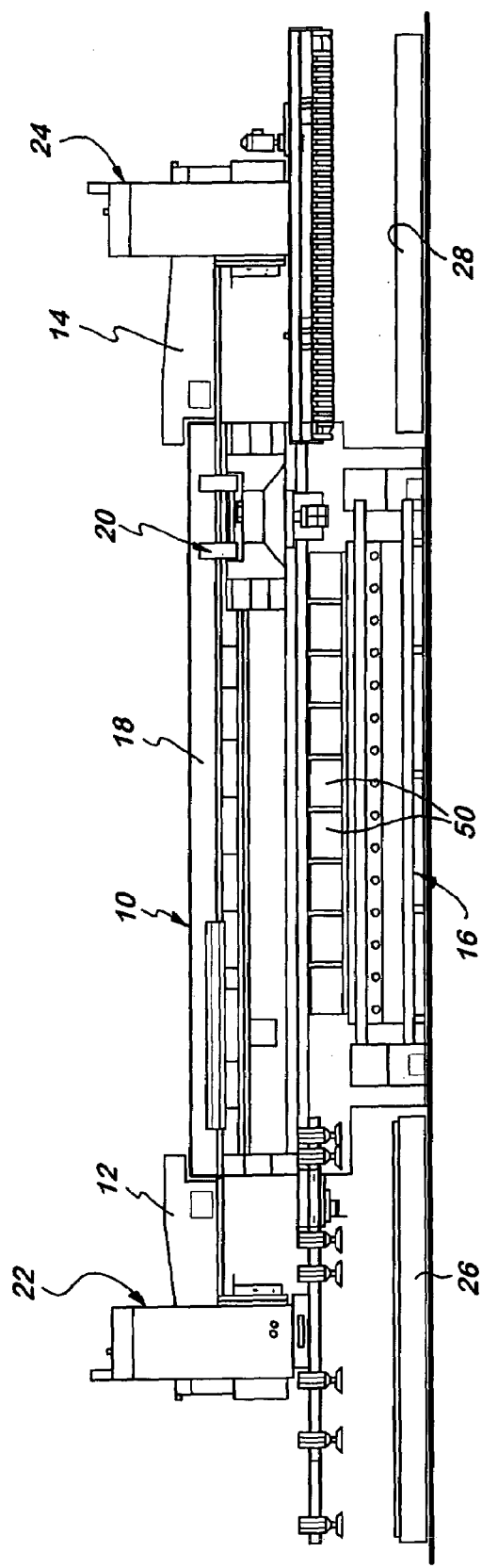
FIG. 1 is a front elevational view of a laser cutting machine embodying the present invention and with both the loading and unloading units being shown in their home positions.

Turning first to FIG. 1, a laser cutting machine embodying the present invention has an elongated C-shaped frame generally designated by the numeral 10 with cantilevered extensions 12, 14 at each end thereof. Centrally of the frame 10 is a workpiece support table generally designated by the numeral 16. Movably supported on the upper arm 18 of the machine frame 10 is a motion unit generally designated by the numeral 20.

Shown in its home position supported on the extension 12 is a loading unit generally designated by the numeral 22, and supported on the extension 14 is an unloading unit generally designated by the numeral 24. Below the loading unit 22 is a stack 26 of sheet metal workpieces and below the unloading unit 24 is a platform upon which cut parts and sheet metal skeletons 28 are deposited by the unloading unit 22.

The motion unit 20, loading unit 22 and unloading unit 24 are all reciprocatably supported on tracks 30 on the lower surfaces of the upper arm 32 of the machine frame 10 and of the extensions 12, 14.

Figure 2:
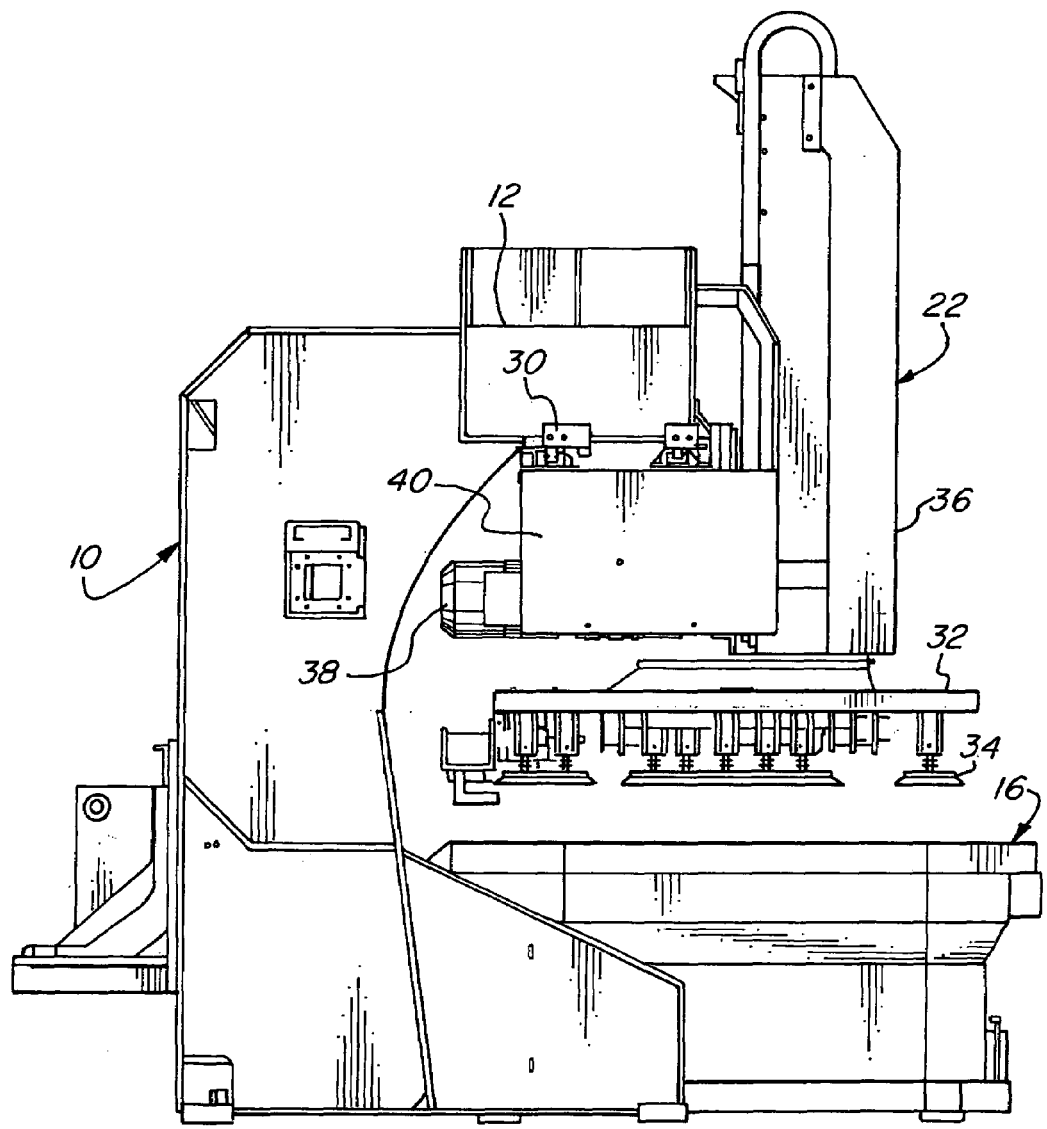
FIG. 2 is an end elevational view of the loading unit end of the machine of FIG. 1 and drawn to an enlarged scale.

Turning first in detail to the loading unit 22 as seen in FIG. 2, it has a carrier frame 32 which supports a large number of suction cups 34 in a grid pattern and these are individually connected to a suction or vacuum source (not shown). The carrier frame 32 is supported on the housing 36 which can be moved upwardly and downwardly by a computer controlled motor 38 supported in the housing 40 and a chain mechanism (not shown). As is conventional, the housing 36 contains computer controlled valves which enable selective activation of only those suction cups necessary to pick up, lift and carry a workpiece 26 from the stack thereunder. The housing 40 is supported on the tracks 30.

Figure 3:
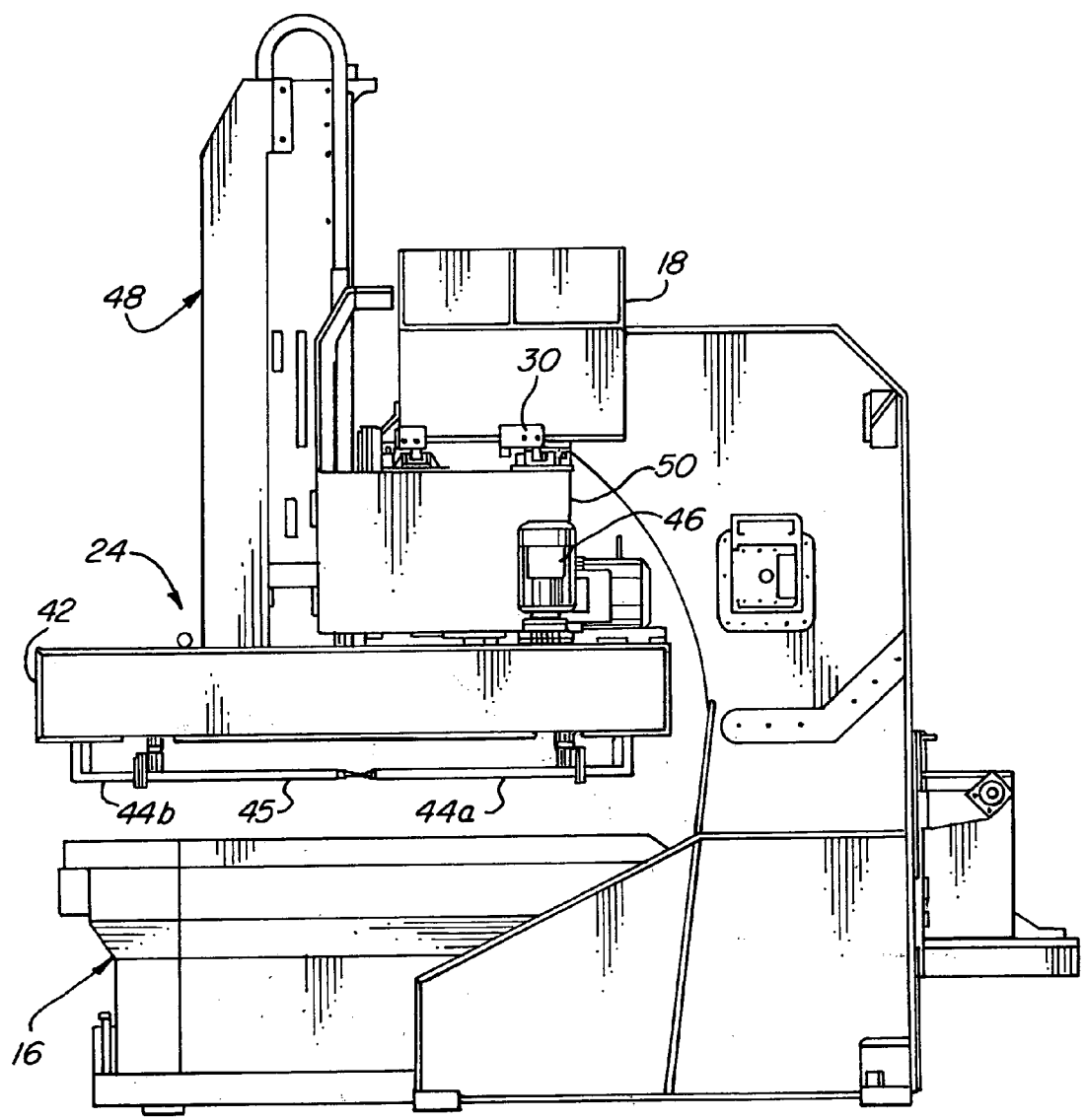
FIG. 3 is an end elevational view of the unloading unit end of the laser cutting machine and drawn to an enlarged scale.
Figure 4A:
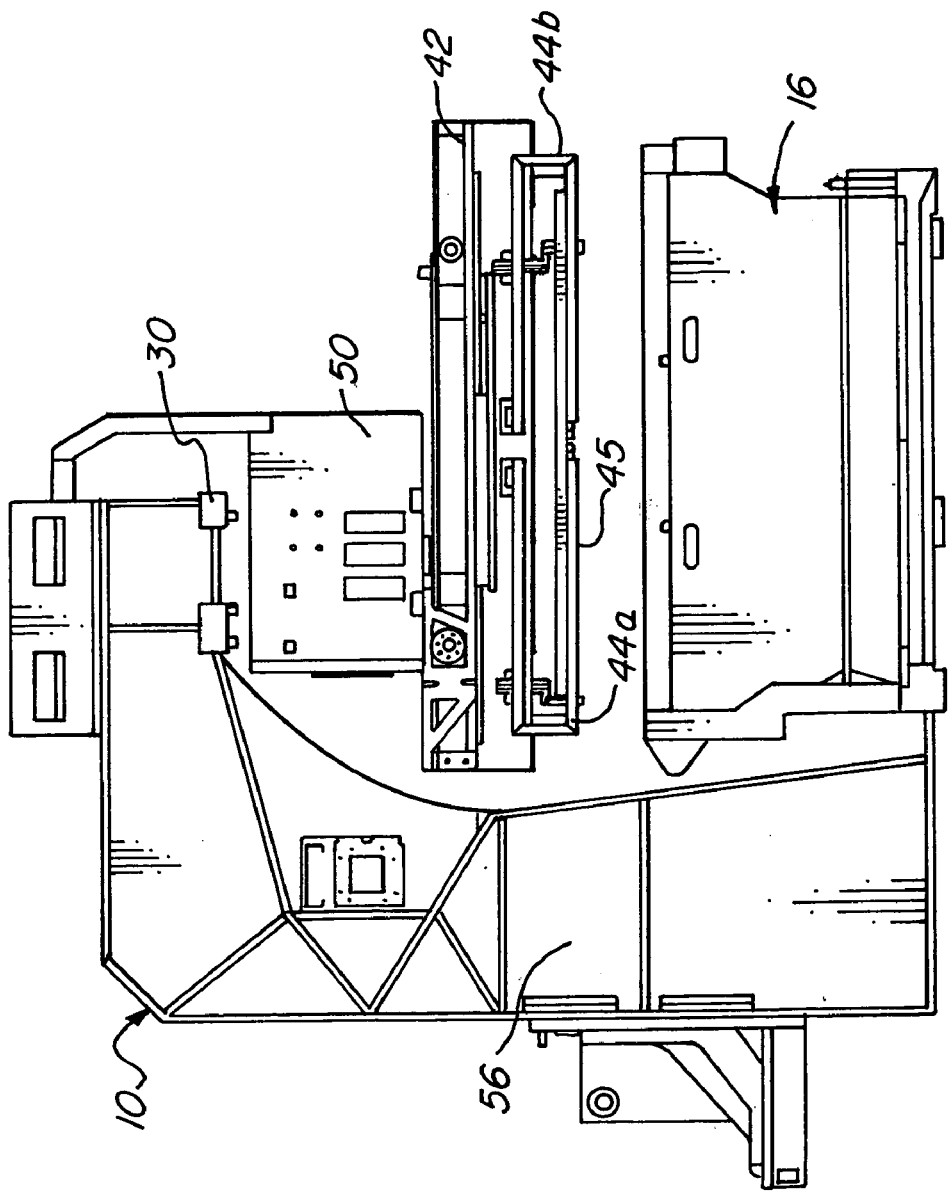
FIG. 4a is a view of the unloading unit with the forks opened to allow the unloading unit to move downwardly to pick up the cut parts and skeleton from the top surface of the workpiece support table.
Figure 4B:
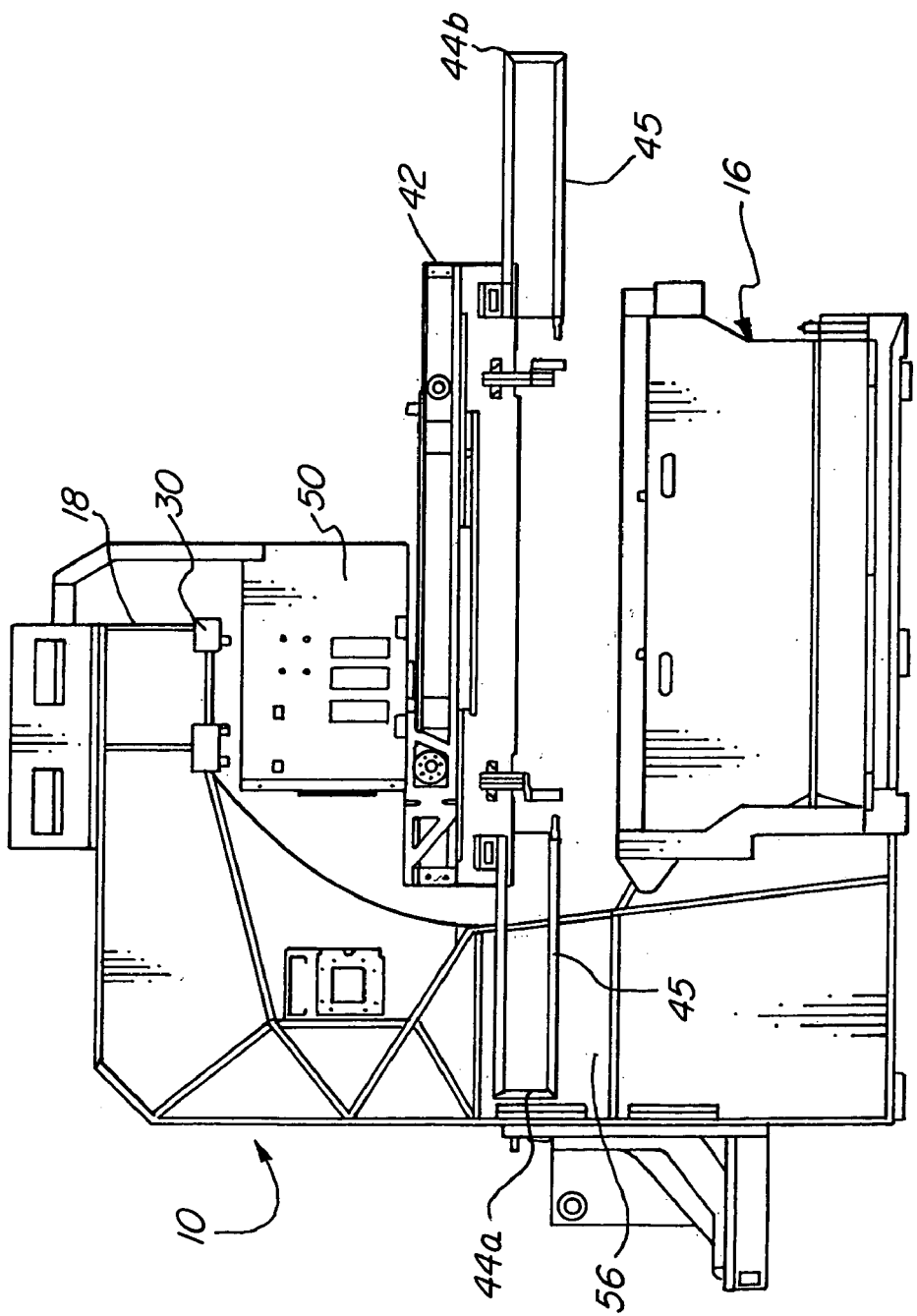
FIG. 4b is a cross sectional view of the laser cutting machine showing the unloading unit after it has picked up the parts and skeleton from the workpiece support table.
Figure 4C:
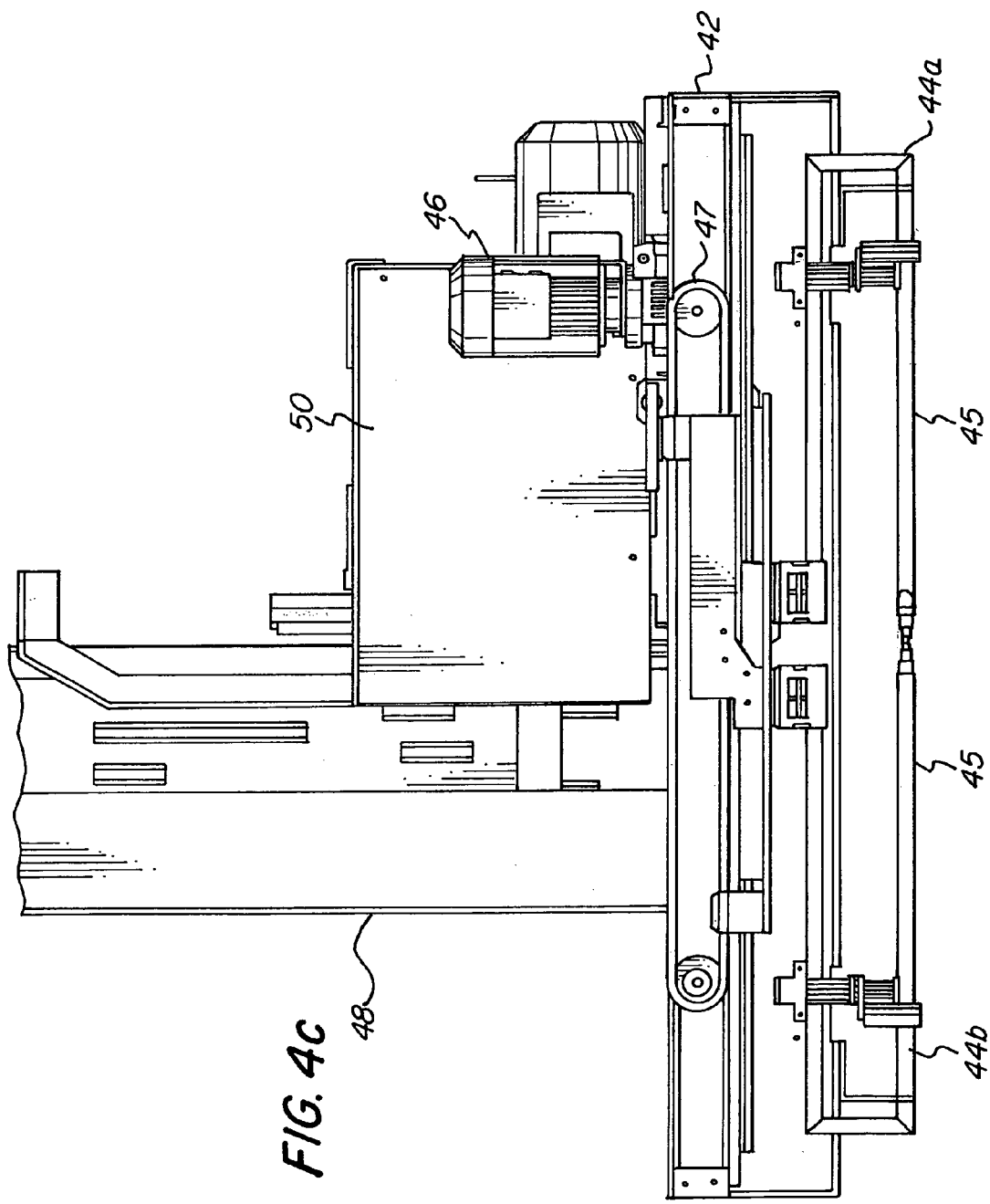
FIG. 4c is an enlarged cross sectional view of the operative portion of the unloading unit illustrating the drive mechanism for moving the fork assemblies.

Turning next to the unloading unit 24 as seen in FIGS. 3, 4a and 4b, a frame 42 which reciprocatably supports opposed fork assemblies 44 comprised of a multiplicity of individual, parallel forks 45 of generally C-shaped configuration. These fork assemblies 44a, 44b are reciprocated between an open position shown in FIG. 4a and a closed pickup position shown in FIG. 4b. This motion is effected by a drive motor 46 on the frame 42 and a drive chain 47 connected to the fork assemblies 44a, 44b. The frame 42 is supported on the housing 48 which is movable vertically on the housing 50 which is movable longitudinally of the machine frame 10 on the tracks 30.

For movement on the machine frame 10 from its home position seen in FIG. 1 to its pickup location, the fork assemblies 44a, 44b are in the position shown in FIG. 4b. After the unloading unit 24 has been moved to the pick up location over the workpiece support table 16, the fork assemblies 44a, 44b are moved into their open position shown in FIG. 4a. This enables the frame 42 and fork assemblies 44a, 44b to move downwardly into the pickup position. To enable the closed ends of the fork assemblies 44a, 44b and the forks 45 to be moved outwardly of the support grid 52 of the workpiece support table 16, the vertical wall 54 of the machine frame 10 has a series of horizontally spaced recesses 56 into which the closed end of the fork assembly 44a is moved. The closed end of the folk assembly 44b is also moved outwardly of the support grid 52. This allows the inner ends of the forks 45 to clear the grid 52 of the workpiece support table 16. The frame 42 and fork assemblies 44a, 44b are moved downwardly until the forks 45 are disposed below the top surface of the support grid 52 on the workpiece support table 16. The motor 46 is then actuated to move the fork assemblies 44a, 44b to their closed position below the parts and skeletons 28 on the grid 52. The drive motor (not shown) for the vertical motion of the housing 48 and frame 42 is then actuated to lift the parts and skeleton 28 from the grid 52 and move the frame 42 to the elevated position seen in FIG. 4a so that the unloading unit 24 with the removed parts may be moved along the tracks 30.

Figure 6:
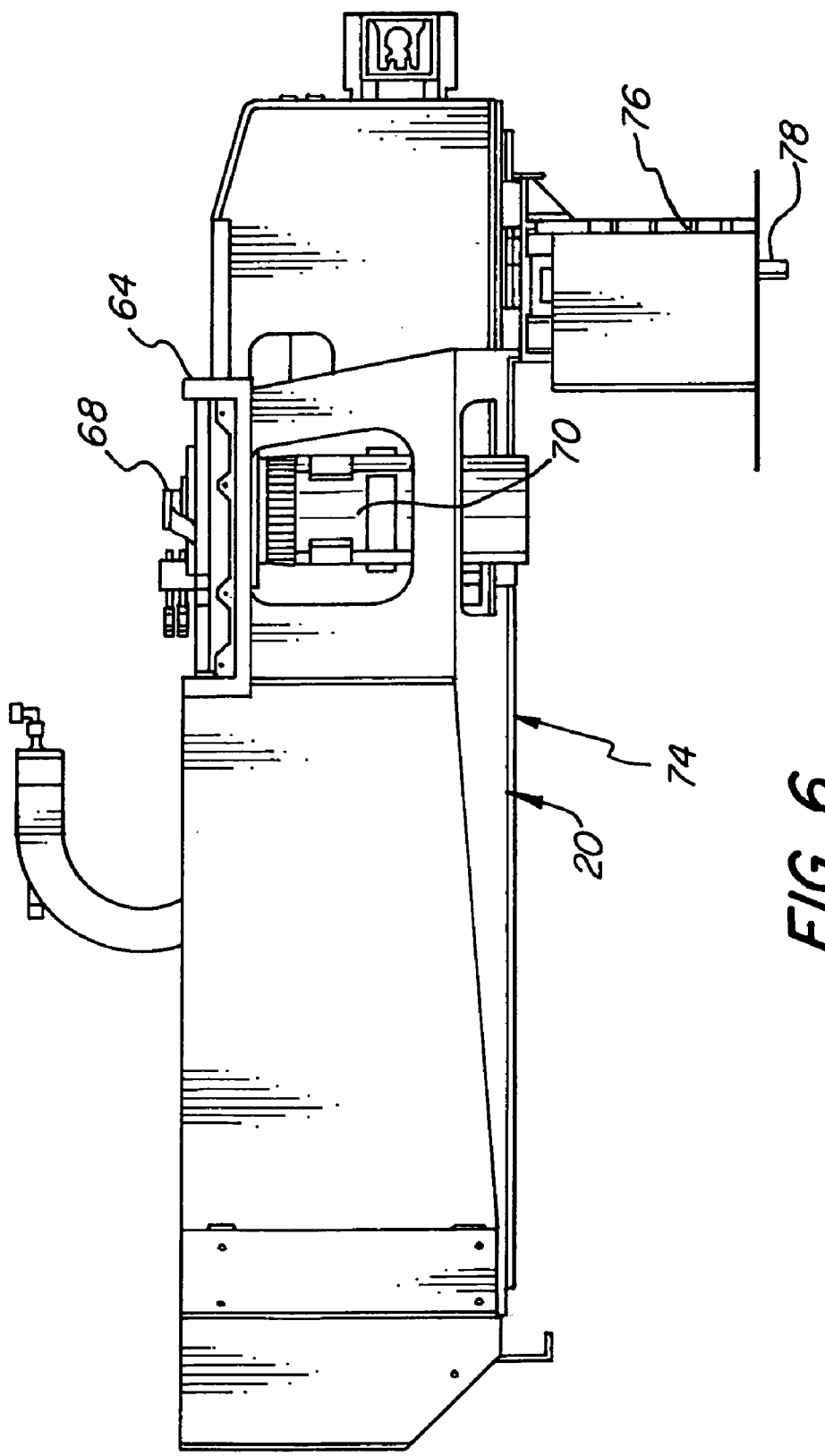
FIG. 6 is an elevational view of the other side of the motion unit of FIG. 1 as supported on the tracks on the machine frame.
Figure 7:
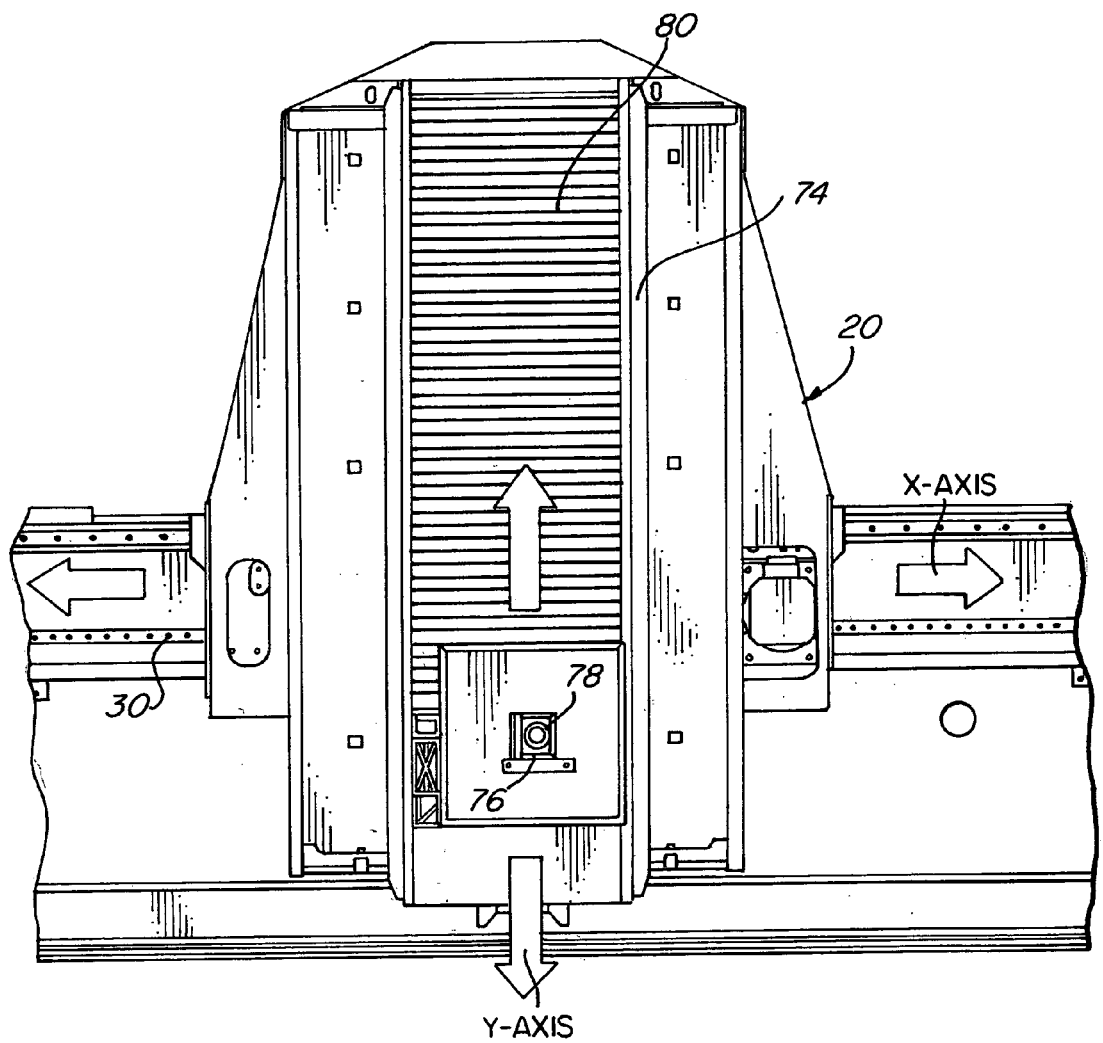
FIG. 7 is a bottom view of the motion unit showing the axes of movement of the cutting unit.

Turning next in detail to the motion unit 20 as seen in FIGS. 5–7, it has a housing generally designated by the numeral 60 and a machine track mounting plate 64 with carriages 66 which are supported on the tracks 30. A pinion 68 is driven by the bidirectional motor 70 and meshes with a rack 72 on the lower surface of the upper arm 18 of the machine frame 10 to effect movement of the motion unit along the tracks 30.

As seen in FIG. 7, the motion unit 20 with the laser cutting unit 76 moves along the tracks 30 to cut the workpiece in the X-axis and the laser cutting unit 76 moves on the tracks 74 of the motion unit 20 to cut in the Y-axis.

To connect the motion unit 20 to the loading and unloading units 22, 24, coupling devices 90 are provided on the loading and unloading units 22, 24. These are used not only to couple the motion unit 20 to the loading and unloading units 22, 24 but also to engage the machine frame 10 to retain the unit in its home position when uncoupled from the motion unit 20. The coupling device 90 will normally be engaged with the unloading unit and snap into engagement with the motion unit 20. When the units 22, 24 are latched in the home position, the motion of the motion unit 20 away from the unit 22, 24 will unlatch the control unit from the coupling device 90.

Movably mounted on tracks 74 is a laser cutting unit generally designated by the numeral 76 and containing the laser cutting head 78. The laser cutting unit 76 is coupled to a bellows 80 (seen in FIG. 7). Optics supported on the machine frame 10 direct the laser beam along the machine frame 10 and then into the Y-axis beam bellows (not shown) and through another set of optics into the moving cutting unit 76 and the laser cutting head 78.

In the laser cutting unit is a motor (not shown) which rotates a pinion gear (not shown) to move the unit 76 along Y-axis 74. Also disposed in the cutting unit 76 is a second drive motor (not shown) to move the cutting head 78 vertically (Z-axis).

Also fragmentarily illustrated are various cables and hoses for operation of the motors and suction devices.

FIGS. 8a–8e illustrate the working cycle of the laser cutting machine of FIG. 1. As seen in FIG. 8a, the motion unit 20 has moved to pick up the empty unloading unit 24 which is latched in its home position.

Turning next to FIG. 8b, the Motion unit 20 has now moved the unloading unit 24 into its operative position over the workpiece support table 16. At this point, the fork assemblies 44a, 44b (added space) are moved to their open position and the frame 42 with the fork assemblies 44a, 44b is moved downwardly to a position below the upper surface of the grid 52. The fork assemblies 44a, 44b are moved to their closed position with the forks 45 being disposed between the grid elements 52. The frame 42 is then moved upwardly and the forks 45 lift the skeleton and the parts 28 from the surface of the workpiece support table 16 since they are now supported on the fork assemblies 44a, 44b. At this point in time, the motion unit 20 has been engaged by the coupling device 90 to the loading unit 22, and the loading unit 22 has picked up a sheet workpiece 26.

FIG. 8c shows that the motion unit 20 has moved to the right in the drawing and it has also moved both units 22, 24. As a result, the unloading unit 24 is disposed over the platform 28. Operating the fork assemblies 44a, 44b to move them into their open position causes the parts and skeleton 26 to drop onto the platform 28. The workpiece 26 supported by the loading unit 22 is now moved downwardly to place it on the upper surface of the workpiece support table 16 and the suction is then terminated to release the workpiece 26.

Turning next to FIG. 8d, the motion unit 20 has been unlatched from the coupling device 90 of the unloading unit 24, and it has moved the loading unit to its home position. The loading unit 22 has been latched into position and the coupling device 90 thereafter disengaged from the control unit 20.

As seen in FIG. 8e, the motion unit 20 is free from both units 22, 24 is now moved into its operative position over the workpiece 26 on the workpiece support table 16 and the guidance system now moves the motion unit 20 in the X-axis on the machine frame 10 and the laser cutting unit 76 in the Y-axis to effect the desired cutting operations upon the workpiece 26.

As can be seen from the attached drawings, the motion unit with the laser cutting unit is readily accessible to an operator standing in the front of the machine so as to facilitate changing of the optics and other servicing of the cutting head. The motion of the loading and unloading units is controlled by the motion of the motion unit, and the motion unit is easily coupled to and uncoupled from the other units by its motion relative thereto.

It will also be appreciated that the tracks on the upper arm of the frame enable the motion unit to be supported thereon adjacent its center line to increase its stiffness and stability. In the outer end portion, of the cutting unit on the motion unit, the cover for the cutting unit can be quickly removed and the cutting head replaced.

Thus, the laser cutting machine of the present invention may be readily fabricated, is easily operated with relative minimal programming, and is easily serviced.

Having thus described the invention, what is claimed is:

1. A machine tool installation for laser cutting of sheet workpices comprising:
    (a) a workpiece support;
    (b) an elongated machine frame of generally C-shaped configuration providing an arm extending over said workpiece support and having portion extending beyond the ends of said workpiece support to provide loading and unloading stations;
    (c) a track on the lower surface of said arm and extending longitudinally of said frame;
    (d) a motion unit suspended from said track and mounted for movement therealong and having its outer end located adjacent the outer side of said workpiece support, said motion unit being supported on said track adjacent its center to increase its stiffness, said motion unit including means engageable with transport means to transport workpieces from the loading station onto said workpiece support and machined workpieces from said workpiece support to the unloading station;
    (e) drive means for moving said motion unit bidirectionally along said track;
    (f) a laser cutting unit mounted on the lower surface of said motion unit and including a laser cutting head movable on said motion unit in an axis perpendicular to said machine frame arm, said cutting head being readily accessible in said cutting unit for servicing and replacement, said motion unit having guides on its lower surface extending perpendicularly to said machine frame arm, said laser cutting unit being movably mounted on said motion unit guides;
    (g) drive means for moving said laser cutting unit along said motion unit, said laser cutting unit being movable on said motion unit to said one end of said motion unit on the outer side of the workpiece support for facile servicing thereof by an operator; and
    (h) a controller operable to control movement of said motion unit along said track to effect motion of said motion unit and of said laser cutting head relative to a workpiece on said workpiece support to produce cut parts, and to position said laser cutting unit at said one end of said motion unit adjacent said outer side of said workpiece support for servicing, said laser cutting head being readily removable from said cutting unit by an operator standing in front of the machine tool installation at such outer side of said workpiece support to facilitate servicing and replacement of said cutting head.

2. The machine tool installation in accordance wit claim 1 wherein a pair of parallel tracks are provided on said arm of said machine frame and said motion unit is movable thereon.

3. The machine tool installation in accordance with claim 1 wherein said motion unit drive means comprises a rack on said arm of said machine frame, a pinion on said motion unit engaged with said rack, and a bidirectional motor for driving said pinion.

4. The machine tool installation in accordance with claim 1 wherein said laser cutting unit is movable on said motion unit guides by a rack and pinion drive assembly and a reversible drive motor.

5. The machine tool installation in accordance with claim 1 wherein laser cutting of the workpiece in the longitudinal direction of the frame (X-axis) is effected by movement of said motion unit on said track and cutting in the direction perpendicular thereto (Y-axis) is effected by movement of said laser cutting unit along said guides on said motion unit.

6. The machine tool installation in accordance with claim 5 wherein said laser cutting unit includes a drive for moving the laser cutting head in the vertical direction.

7. A machine tool installation for laser cutting of sheet workpieces comprising:
(a) a workpiece support;
(b) an elongated machine frame of generally C-shaped configuration providing an arm extending over said workpiece support and having portions extending beyond the ends of said workpiece support to provide loading and unloading stations;
(c) a pair of tracks on the lower surface of said arm and extending longitudinally of said frame;
(d) a motion unit suspended from said tracks and mounted for movement therealong and having its outer end located adjacent the outer side of said workpiece support, said motion unit being supported on said tracks adjacent its center to increase its stiffness, said motion unit including means engageable with transport means to transport workpieces from the loading station onto said workpiece support and machined workpieces from said workpiece support to the unloading station;
(e) drive means for moving said motion unit bidirectionally along said tacks, said drive means comprising a rack on said arm of said machine frame, a pinion on said motion unit engaged with said rack, and a bidirectional motor for driving said pinion;
(f) a laser cutting unit mounted on the lower surface of said motion unit and including a laser cutting head movable on said motion unit in an axis perpendicular to said machine frame arm, said cutting head being readily accessible in said cutting unit for servicing and replacement, said motion unit having guides on its lower surface extending perpendicularly to said machine frame arm, said laser cutting unit being movably mounted on said motion unit guides, said laser cutting unit including a drive for moving the laser cutting head in the vertical direction;
(g) drive means for moving said laser cutting unit along said motion unit, said laser cutting unit begin movable on said motion unit to said one end of said motion unit on the outer side of the workpiece support for facile servicing thereof by an operator; and
(h) a controller operable to control movement of said motion unit along said track to effect motion of said motion unit and of said laser cutting head relative to a workpiece on said workpiece support to produce cut parts, and to position said laser cutting unit at said one end of said motion unit adjacent said outer side of said workpiece support for servicing, said laser cutting head being readily removable from said cutting unit by an operator standing in front of the machine tool installation at said outer side of said workpiece support to facilitate servicing and replacement of said cutting head.

8. A machines tool installation for laser cutting of sheet workpieces comprising:
(a) a workpiece support;
(b) an elongated machine frame of generally C-shaped configuration providing an arm extending over said workpiece support and having portions extending beyond the ends of said workpiece support to provide loading and unloading stations;
(c) a pair of tracks the lower surface of said arm and extending longitudinally of said frame;
(d) a motion unit suspended from said tracks and mounted for movement therealong and having its outer end located adjacent the outer side of said workpiece support, said motion unit being supported on said track adjacent its center to increase its stiffness, said motion unit including means engageable with transport means to transport workpieces from the loading station onto said workpiece support and machined workpieces from said workpiece support to the unloading station said motion unit having guides on its lower surface extending perpendicularly to said machine frame arm;
(e) drive means for moving said motion unit bidirectionally along said track;
(f) a laser cutting unit mounted on the lower surface of said guides of said motion unit and including a laser cutting head movable on said motion unit in an axis perpendicular to said arm, said cutting head being readily accessible in said cutting unit for servicing and replacement, said motion unit having guides on its lower surface extending perpendicularly to said machine frame arm, and said laser cutting unit being movably mounted on said motion unit guides;
(g) drive means for moving said laser cutting unit along said motion unit, said laser cutting unit is movable on said motion unit guides by a rack and pinion drive assembly and a reversible drive motor, said laser cutting unit being movable to said one end of said motion unit on the outer side of the workpiece support for facile servicing thereof by an operator, laser cutting of the workpiece in the longitudinal direction of the frame (X-axis) being effected by movement of said motion unit on said tracks and cutting in the direction perpendicular thereto (Y-axis) is effected by movement of said laser cutting unit along said guides on said motion unit; and
(h) a controller operable to control movement of said motion unit along said track to effect motion of said motion unit and of said laser cutting head relative to a workpiece on said work place support to produce cut parts, and to position said laser cutting unit at said one end of said motion unit adjacent said outer side of said workpiece support for servicing, said laser cutting head being readily removable from said cutting unit by an operator standing in front of the machine tool installation at said outer side of said workpiece support to facilitate servicing and replacement of said cutting head.

* * * * *

UNITED STATES PATENT AND TRADEMARK OFFICE
CERTIFICATE OF CORRECTION

| | | |
|---|---|---|
| PATENT NO. | : 7,141,758 B2 | Page 1 of 1 |
| APPLICATION NO. | : 10/676553 | |
| DATED | : November 28, 2006 | |
| INVENTOR(S) | : Leonid Zeygerman et al. | |

It is certified that error appears in the above-identified patent and that said Letters Patent is hereby corrected as shown below:

Column 6, line 11, "portion" should be --portions--

Column 7, line 28, "tacks" should be --tracks--

Column 8, line 49, "work place" should be --workpiece--

Signed and Sealed this

Sixth Day of March, 2007

JON W. DUDAS
*Director of the United States Patent and Trademark Office*